United States Patent [19]

Kerawalla

[11] Patent Number: 5,154,969
[45] Date of Patent: Oct. 13, 1992

[54] BONDED FIBROUS ARTICLES

[75] Inventor: Jal N. Kerawalla, Greenville, N.C.

[73] Assignee: E. I. Du Pont de Nemours and Company, Wilmington, Del.

[21] Appl. No.: 782,861

[22] Filed: May 16, 1991

Related U.S. Application Data

[63] Continuation-in-part of Ser. No. 533,607, Jun. 5, 1990, abandoned.

[51] Int. Cl.$^5$ .............................................. D04H 1/58
[52] U.S. Cl. ..................................... 428/288; 428/373
[58] Field of Search .................... 428/288, 296, 373

[56] References Cited

U.S. PATENT DOCUMENTS

| | | | |
|---|---|---|---|
| 3,535,481 | 10/1970 | Korb | 219/10.41 |
| 3,819,402 | 6/1974 | Thrower | 117/93.1 DH |
| 4,003,840 | 1/1977 | Ishino | 252/62 |
| 4,401,708 | 8/1983 | Paul | 428/198 |
| 4,668,562 | 6/1987 | Street | 428/218 |
| 4,753,693 | 6/1988 | Street | 156/62.8 |
| 4,795,668 | 1/1989 | Krueger et al. | 428/296 |
| 4,818,599 | 4/1989 | Marcus | 428/296 |
| 4,940,502 | 7/1990 | Marcus | 428/296 |
| 5,023,131 | 6/1991 | Hwok | 428/296 |
| 5,057,168 | 10/1991 | Muncrief | 428/296 |

FOREIGN PATENT DOCUMENTS 8800258 1/1988 PCT Int'l Appl.

Primary Examiner—James J. Bell

[57] ABSTRACT

Bonding non-woven fibrous structures, especially using polyester fibers as the load-bearing elements, with electromagnetic radiation after applying an electromagnetic radiation susceptor to a polyester fiber with a high amorphous content so it acts as a binder fiber between load-bearing elements.

9 Claims, 4 Drawing Sheets

BONDED FIBROUS ARTICLES

CROSS REFERENCE TO RELATED APPLICATIONS

This application is a continuation-in-part of my parent application No. 07/533,607, filed Jun. 5, 1990, now abandoned.

TECHNICAL FIELD

This invention relates to bonded fibrous articles, and particularly to improvements in and relating to the bonding of non-woven fibrous structures, typically batt-like structures, and includes new processes, or techniques, new bonded articles and structures that are obtainable thereby, and preferred new polyester fibers for use therein.

BACKGROUND

Bonded non-woven fibrous articles, such as batts and shaped articles such as cushions, toys and fabrics, have previously been made from an air-laid or wet-laid blend of low melting fusible fibers with higher melting or nonfusible fibers that are bonded and become the load-bearing structural elements (or at least supply a significant portion thereof) in the eventual bonded structure. The fusible fibers are generally referred to herein as binder fibers, but are also referred to as a second fiber constituent of the blends. The higher melting fibers are generally referred to herein as load-bearing fibers, or as a first constituent of the blends. In the resulting bonded articles, such bonded fibers have a relatively high temperature resistance in contrast to a relatively low flow temperature for the bonding agent that bonds the fibers. The term "through bonding" is used to indicate what is generally desired in relation to such bonded articles, namely sufficient bonding throughout its depth so the batt acts as integral unit, i.e. so as to avoid separation between any individual layers forming the original batts. Bonding derived from spraying (and then activating) a liquid resin binder onto a batt has not generally provided such through bonding, because spraying a liquid binder onto the surface(s) of a preformed batt does not generally enable the binder resin to penetrate throughout the batt.

Through-bonded batts have been bonded hitherto by conventional means of heating, such as conduction, convection, or radiation. I have noted that such bonding of these batts by such conventional means has been a slow and time-consuming operation. The batts are good insulators, i.e. their conductivity is low, natural convection is difficult and infrared radiation cannot penetrate the fibers. Other problems have been caused by the slow rate of heat transfer, which can lead to overheating and thermal degradation of outside fibers, and/or the inside of the batt may not even get hot enough to activate the binder fibers properly.

Street U.S. Pat. Nos. 4,668,562 and 4,753,693 and Wm. T. Burnett (Brooks) WO 88/00258, discuss and indicate some of the problems encountered heretofore. Thus, forced convection can be used to speed up the heating, i.e. hot air can be forced through the structure to be bonded. But forced convection can be used to bond only certain structures such as lend themselves to air suction or blowing. Also, the force exerted by the air flow pulls the fibers close to each other, i.e. densifies the batt, so lighter weight bonded structures cannot be prepared by this technique.

Thus, prior techniques have not only been slower than would be desirable, but have led (sometimes) to undesirable structural characteristics. A problem, for example, in some high density batts has been that the use of heated air has created non-uniform density, with a higher density at the bottom of the batts. I believe that the main cause has been that the load-bearing fibers have been heated to the same temperature as the binder fibers and, at such temperature, are close to their glass transition temperature. The load-bearing fibers lose some of their desirable characteristics at these temperatures. For instance, these fibers near the bottom of the batt have given way under the weight of the upper portion of the batt. Another deficiency of many prior high density, hot air-bonded blocks has been that the middle has been less bonded than the surface, because the surface has been more accessible to the heated air. Usually, for products such as cushions or mattress cores, it is desired to have a firmer (more bonded) center and softer outside layers. In hot air-bonding, just the opposite has happened.

So, an important objective of the present invention has been to improve the speed of the thermal bonding process over what has previously been done commercially. Another objective has been to overcome some of the limitations that may have been inherent in various prior commercial bonding techniques. Cost-effectiveness is always an important objective for any commercial operation.

I have succeeded by using heat generated internally within the fibrous structure by an oscillating electric field, referred to generally herein as dielectric heating, and produced by electromagnetic radiation (EMR). Others may have been discouraged because existing commercially-marketed fibers, in general, and polyester textile fibers, in particular, have not generated enough energy in an oscillating field. Indeed, polyesters in general are good insulators and have low dielectric or inductive loss. This property is why polyesters are useful in capacitors.

It has been suggested (e.g. in U.S. Pat. Nos. 3,535,481 (Korb) and 4,003,840 (Ishino) and in GB 2,196,343) to introduce extraneous particles, such as ferrometallic or other conductive materials, into the structure and generate heat inductively, but this technique has not proved satisfactory for my purposes.

Paul, in U.S. Pat. No. 4,401,708 claims a method of bonding using microwave energy and a polar solvent (such as trichloroacetic acid) to produce non-woven fabrics, especially for use as carpet backing. This method may be advantageous for the special end-use indicated, but, for most purposes, would present practical problems of control, e.g., in applying the solvent to the appropriate locations (for instance to all the fibers), at the time desired (which would usually be just before bonding), without excessive degradation by the solvents upon prolonged exposure to fibers, and uniformly (so as to heat the fibers uniformly, if desired), or selectively (when it would be desired not to heat or otherwise affect some fibers). Also, such solvents do weaken the fibers, as indicated. Such solvents can also be toxic. So there would be several disadvantages in trying Paul's approach to solve my problem.

SUMMARY OF INVENTION

One essential element of my invention is the use of dielectric heating. As indicated, dielectric heating has been suggested previously, but only with prior techniques that are distinctly different from my invention. These prior techniques have produced structures that are distinctly different from my invention. Another element of my invention is to use at least two components, (1) susceptible binder fibers, i.e. fibers that are susceptible to dielectric heating and thus act as binder fibers, with (2) conventional load-bearing fibers that are relatively less susceptible or insensitive to dielectric heating, and that are bonded by the susceptible binder fibers. A blend may be used of these two types of fibers. Alternatively, sheath/core binder fibers may be used as disclosed herein, or a blend of sheath/core binder fibers with load-bearing fibers if desired. A further element of my invention is the provision of an EMR (electromagnetic radiation) susceptor to the binder fibers, as will be described. An important aspect of the invention, as indicated hereinafter, is the provision of polyester fibers of a type so that, in the presence of such EMR susceptor (and, of course, moisture), they become activated by EMR and act as a binder for the blend.

According to one aspect of my invention, there is provided a process for making a bonded fibrous batt or other bonded article, comprising the steps of (1) forming a mass, preferably a blend of at least first and second fiber constituents, said first fiber constituent having a relatively high temperature-resistance in contrast to a relatively low bonding temperature for the second fiber constituent, wherein an effective amount of an EMR susceptor and moisture are applied to at least the second constituent fiber in such amounts as to raise the temperature of such mass, preferably a blend to over 100° C. within a period of at most 6 minutes upon exposure in a 650 watt microwave (MW) oven in the glass tube test, and (2) subjecting the mass, preferably a blend, to an oscillating electric field, so as to raise the temperature of the binder material, and allowing the blend to cool, and thereby effect bonding. As will be understood, if sheath/core binder fibers are used, there may be no need to form a blend of different fibers. I shall, however, refer herein to a blend, for convenience.

As indicated, the first fiber constituent of the blend becomes the load-bearing fibers in the bonded products. Preferably such fibers are polyesters, such as poly(ethylene terephthalate), which are not susceptible to EMR. Other suitable fibers are listed hereinafter. It is advantageous to use fibers that are not directly affected by the EMR. It is preferred, therefore, that they not have an EMR susceptor applied thereto at the time the blend is subjected to the oscillating electric field, so as to avoid direct heating of such fibers thereby. Accordingly, it is preferred not to apply an EMR susceptor to these load-bearing fibers during manufacture, e.g. in the spin-finish. If any such EMR susceptor has been applied, it should preferably be removed before subjection of the blend to the oscillating electric field. However, when the blend is subjected to the oscillating electric field, the binder fibers will be heated, so the remainder of the blend will become heated also, more slowly, because of the presence of the heated binder fibers, and the insulating nature of the fibers will generally mean that heat will not escape from the mass quickly.

Thus, it may be preferred to maximize use of the EMR equipment, by a 2-stage bonding process, in which the blend is first subjected to the oscillating electric field in, e.g., a microwave oven, and then the blend is removed from the source of EMR and placed in a mold, where the product cools and is shaped as it cools. Accordingly, the process may conveniently be a wholly batch process, or a mixture of continuous and batch processing with, for instance, a continuous batt of the blend being passed through a microwave oven, or other convenient source of EMR, and then being chopped up into separate units that are cooled in shaped molds to provide the desired shaped products. Another possibility is to use a 1-stage process in which the blend is treated in the same apparatus throughout both stages of subjecting to the oscillating electric field and of cooling. The cooling is generally rather slow, whereas the treatment with an oscillating electric field may be much quicker.

The second fiber constituent is the binder fiber. Preferred binder fibers are mentioned hereinafter, in more detail, and are another aspect of the invention.

According to one such further aspect, there is provided a fiber of poly(ethylene terephthalate) that shows a crystallization peak and that contains an EMR susceptor in such amount as to raise the temperature of a 50/50 blend, by weight, thereof with poly(ethylene terephthalate) having a crystalline melting point and in the presence of an effective amount of moisture, to over 100° C. within a period of at most 6 minutes upon exposure in a 650 watt MW oven in the glass tube test.

According to a still further aspect, there is provided a fiber of an ethylene terephthalate copolymer with at least sufficient comonomer that the copolymer does not show a crystallization peak, and containing an EMR susceptor in such amount as to raise the temperature of a 50/50 blend, by weight, thereof with poly(ethylene terephthalate) having a crystalline melting point, and in the presence of an effective amount of moisture, to over 100° C. within a period of at most 6 minutes upon exposure in a 650 watt MW oven in the glass tube test.

According to another aspect, there are provided preferred bonded fibrous batts, or other articles of bonded fibers, having a relatively high temperature-resistance in contrast to a relatively low flow temperature for the bonding agent that bonds said fibers, wherein said bonding agent is an ethylene terephthalate polymer containing an EMR susceptor. It will be understood that, although the binder material is used in the process in the form of binder fiber, during bonding the binder melts, flows and then cools in different configurations so as to bond the load-bearing fibers. In other words, in the bonded articles, the binder material is no longer in its original fiber form, as a general rule.

Still further aspects are evident from the description herein, for instance the use of sheath/core binder fibers instead of or in addition to blending constituent fibers.

DETAILED DESCRIPTION OF THE INVENTION

Figure 1:
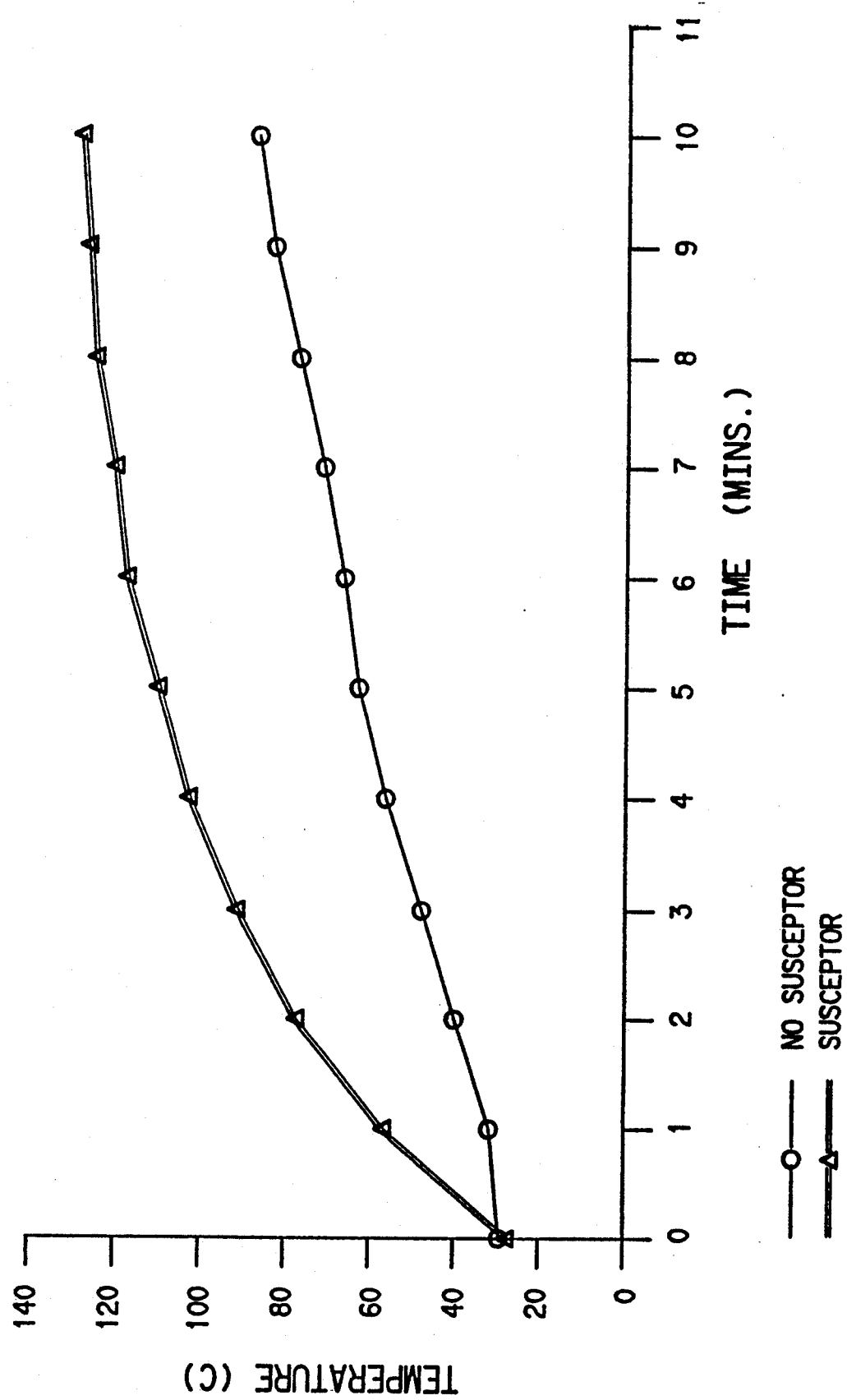
FIGS. 1-3 show curves plotting temperature against time for various fiber blends as described hereinafter.

Crystalline polyesters, such as the conventional drawn fibers of poly(ethylene terephthalate) (sometimes referred to as 2G-T) that have been available commercially for some 40 years, are not EMR-susceptible (not heatable in an oscillating electric field). This has been a problem for prior art attempts to heat such polyester fibers directly by EMR, but is advantageous, according to my invention, as this makes such fibers useful as load-bearing fibers, i.e. as the first fiber constituent of the blend that I use to make my new batt, i.e. of my feed blend. Such conventional crystalline polyester fibers are not useful for the binder material (i.e. the second fiber constituent of the blend) according to my invention.

Bicomponent fibers, especially sheath-core bicomponent fibers, have been preferred binder fibers for making bonded batts, and are also preferred for certain embodiments of my invention, using for example a core of non-susceptible 2G-T with a sheath of susceptible binder material (with an EMR susceptor) that is activated in the presence of moisture and bonds to the load-bearing fibers. After bonding, the residues of the original binder fibers (i.e. the original cores) act as bridges or links between fibers that did not melt, and so act as load-bearing elements in the bonded structure. This is why sheath-core fibers can be preferred for use as binder fibers (the second fiber constituent of the feed blend) in many instances.

As indicated, conventional drawn 2G-T fibers are often preferred as load-bearing fibers in the blends of my invention. Selection of the optimum load-bearing fiber is any specific instance will, however, depend on various considerations, including the intended use of the bonded structure. For some purposes, aramid fibers, e.g. such as are sold by E. I. du Pont de Nemours & Company under the Trade Marks NOMEX® and KEVLAR®, polyacrylonitrile fibers, e.g. such as are sold by E. I. du Pont de Nemours & Company under the Trade Mark ORLON®, other crystalline polyester fibers (other than 2G-T) such as 4G-T poly(butylene terephthalate), other man-made fibers, such as rayon, natural fibers, such as cotton, fibers suitable for wood pulp and inorganic fibers, such as fiberglass, may all be useful, depending on the specific intended end-use for the bonded structure or article, and provided a suitable binder fiber is used in conjunction. Similarly the denier per filament and cut length (for staple fibers) will be chosen according to end-use requirements, such as resiliency and strength, as will any crimp, which may be important in processing, likewise any finish applied to facilitate processing. As indicated, however, it is preferred to avoid applying to or incorporating into such load-bearing fibers any EMR susceptor, so use of such susceptors should preferably be avoided, for example, in selecting finish constituents for the load-bearing fibers.

Preferred binder fibers for many purposes are of copolyesters of ethylene terephthalate units (radicals) with at least 20%, and preferably about 25 to about 40%, of 2G-I (ethylene isophthalate) radicals (conveniently prepared by reaction of dimethyl isophthalate) or of 2G-HT (ethylene hexahydroterephthalate) radicals, or of 2G-5 (ethylene glutarate) radicals, or of DEG-T (diethylene glycol terephthalate) radicals, or of X-T (paraxylene glycol terephthalate) radicals or like copolyesters that do not show any crystalline peak or defined melting point on a DSC curve, because these binder materials do not crystallize, so may be heated several times (in the presence of the EMR susceptor and moisture) without crystallizing. In contrast, a crystallizable polymer, such as undrawn fibers of 2G-T homopolymer, will indeed crystallize (as indicated by such a crystalline peak on a DSC curve) under certain conditions and this crystallization will henceforth mean that the polymer will not act as a binder material (in the presence of an EMR susceptor and moisture) even if EMR is applied; after crystallization, such 2G-T fibers are, in effect, like load-bearing 2G-T fibers. So, if undrawn 2G-T crystallizable fibers are used for the binder fibers, care must be taken to avoid premature crystallization. But if such care is taken, the very fact that an irreversible change takes place when the bonding occurs may be of advantage for certain applications. I believe that, as regards potential binder fibers, there are two competing effects, and that this competition often determines whether fibers will melt satisfactorily (for bonding purposes) in a microwave field. This is because crystallization (as well as melting) can be triggered by heat generation, in which case crystallization will proceed as heat is generated. The susceptibility of the fibers to microwaves, however, decreases as the crystallinity increases so, in some cases, the heat generation falls so low that the fiber will continue to crystallize rather than melt. This gives rise to three categories of fiber responses in an oscillating field:
  (a) Fibers which are too crystalline to melt at all when subjected to the oscillating field, for example oriented and crystallized (heat set) 2G-T or other fibers such as are useful load-bearing fibers.
  (b) Fibers which are not highly crystalline initially, but which crystallize so fast when subjected to the oscillating field that they stop being susceptible and hence become crystalline before they can melt and bond satisfactorily, for example oriented 2G-T that is only slightly crystallized (non heat set).
  (c) Fibers which are not crystalline initially, and which crystallize sufficiently slowly or not at all during treatment with microwaves and hence remain susceptible, and therefore bind rather than crystallize, for example undrawn 2G-T and drawn and relaxed copolyesters such as those mentioned and described already.

Fibers in category (c) can be used as binders. However, there are times when the power density is not high enough to heat up these fibers rapidly. Then susceptors are needed to accelerate heat generation.

Fibers in category (b), which crystallize fast, will not be satisfactory binder fibers if heated too slowly, because they will crystallize before they melt. Such spun and undrawn 2G-T fibers can be used as binders only if heated rapidly enough so they melt before crystallizing by use of EMR susceptors. However, fibers which crystallize slowly and become tacky before they crystallize, such as the copolyesters mentioned, will be usable as binders even in drawn condition. Thus the EMR susceptor can serve a dual function by rapid and efficient conversion of the microwave energy to heat:
  (1) It can accelerate the heating, so as to ensure melting before crystallization would occur .
  (2) It can accelerate heating so as to make bonding possible in a practical period of time (less than 6 minutes in the test I have described)

So, the following ingredients are generally needed to form bonded structures using dielectric heating fields oscillating at frequencies of $4 \times 10^9$ to $3 \times 10^6$ Hz, also referred to as microwave (MW) ($4 \times 10^9$ to $4 \times 10^8$ Hz) or radio frequency (RF) $4 \times 10^8$ to $3 \times 10^6$ Hz) fields:

Non-susceptible (i.e. non-fusible fibers) such as polyester (2G-T), glass, graphite, aramid, etc.. as mentioned above, to act as the load-bearing part or reinforcing part of the structure.

Susceptible (i.e. fusible) binder fibers, such as undrawn 2G-T or the -copolymers mentioned, that are predominantly non-crystalline, and should not crystallize prior to or during the melting and bonding.

A susceptor such as magnesium chloride (MgC12), or Leomin PN or Tryfac, alkyl potassium phosphates (which are mainly ionic) such as are capable of raising the temperature of the binder fiber rapidly.

Moisture to allow the susceptor to stay ionic and polar.

EMR SUSCEPTIBILITY (GLASS TUBE) TEST

As mentioned, an important function of a susceptor is to raise the binder temperature fast enough so that the binder melts and bonds prior to crystallization. The following "GLASS TUBE" test determines if any potential binder/susceptor combination will be effective for this purpose:

The susceptor is applied topically to the binder fibers (unless it has been incorporated already); I usually applied the susceptor as a 10% (by weight) solution in demineralised water that I applied in amount 10% of the weight of the binder fiber), then this treated binder fiber is blended with the load-bearing fibers in amount 50/50 by weight. When sheath-core fibers are used, 50% of the total weight of the blend should be binder fiber. It is very important that the fibers should be properly (intimately) blended. The fibers should be almost dry (~5% moisture). This blend is made into a sliver. 4 gms of this sliver is wrapped in a fiberglass fabric coated with TEFLON ® flourocarbon resin, put into a glass tube (1 inch ID, 13 inch long) and heated in a 650 watt household microwave oven (we used a Kenmore 650 watt MW oven, Model 566-8868410). The electric field in this test should oscillate at $2.45 \times 10^9$ Hz. We monitored the temperature by using a nonintrusive probe made by Luxtron Corporation (Luxtron 755), and recorded it with a Soltec X-Y1-Y2 recorder Model VP-6424S.

I have determined by extensive testing that, for the melting to preceed crystallization, and in order to obtain effective bonding, within a practical period of time, the temperature should rise to 100° C. consistently within 6 minutes in this test. If the blending is not sufficiently intimate, a result can be misleading, so it is desirable to take at least 4 readings, and ensure that consistent results are obtained, and then use the average of these readings.

Figure 2:
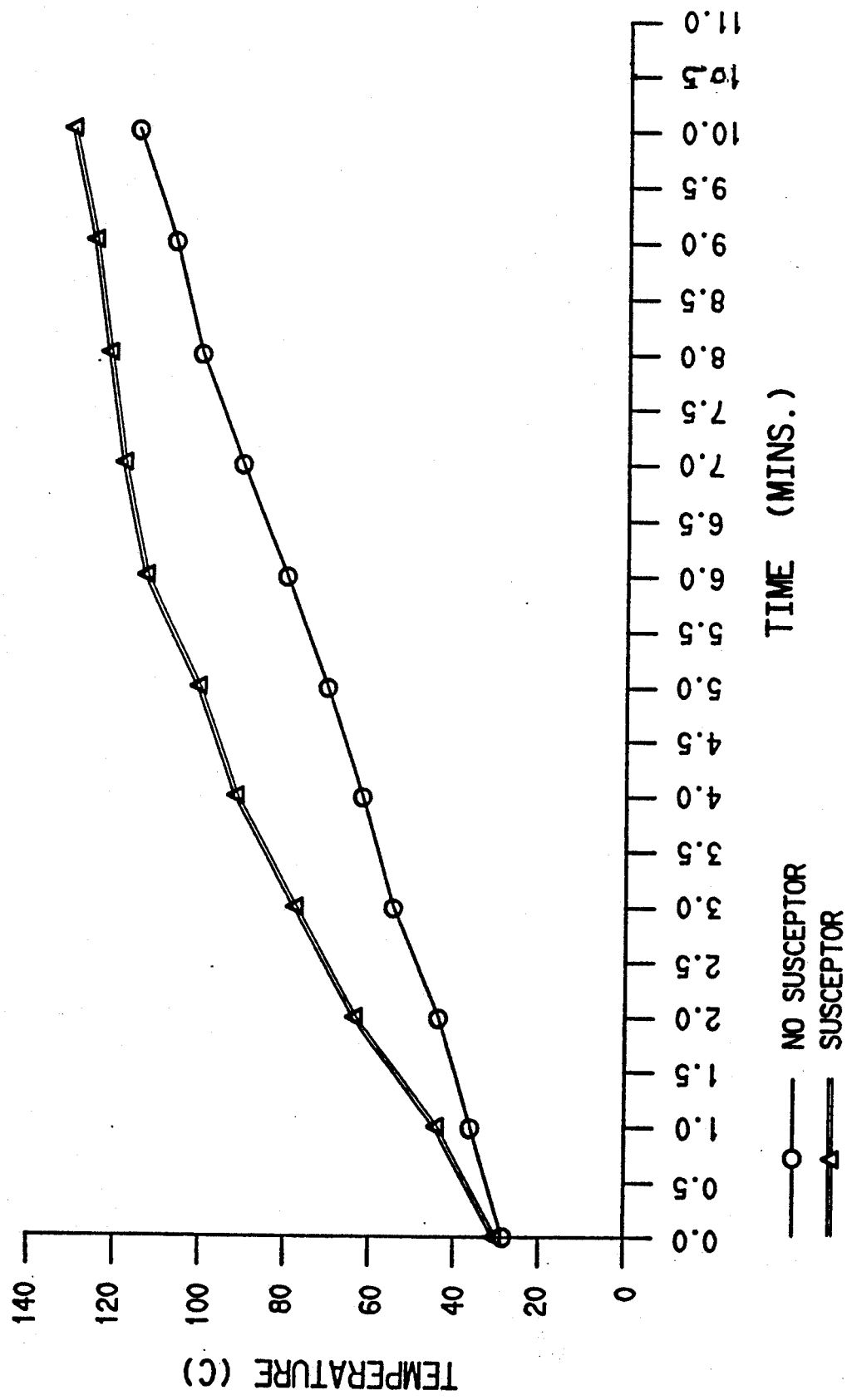
Figure 3:
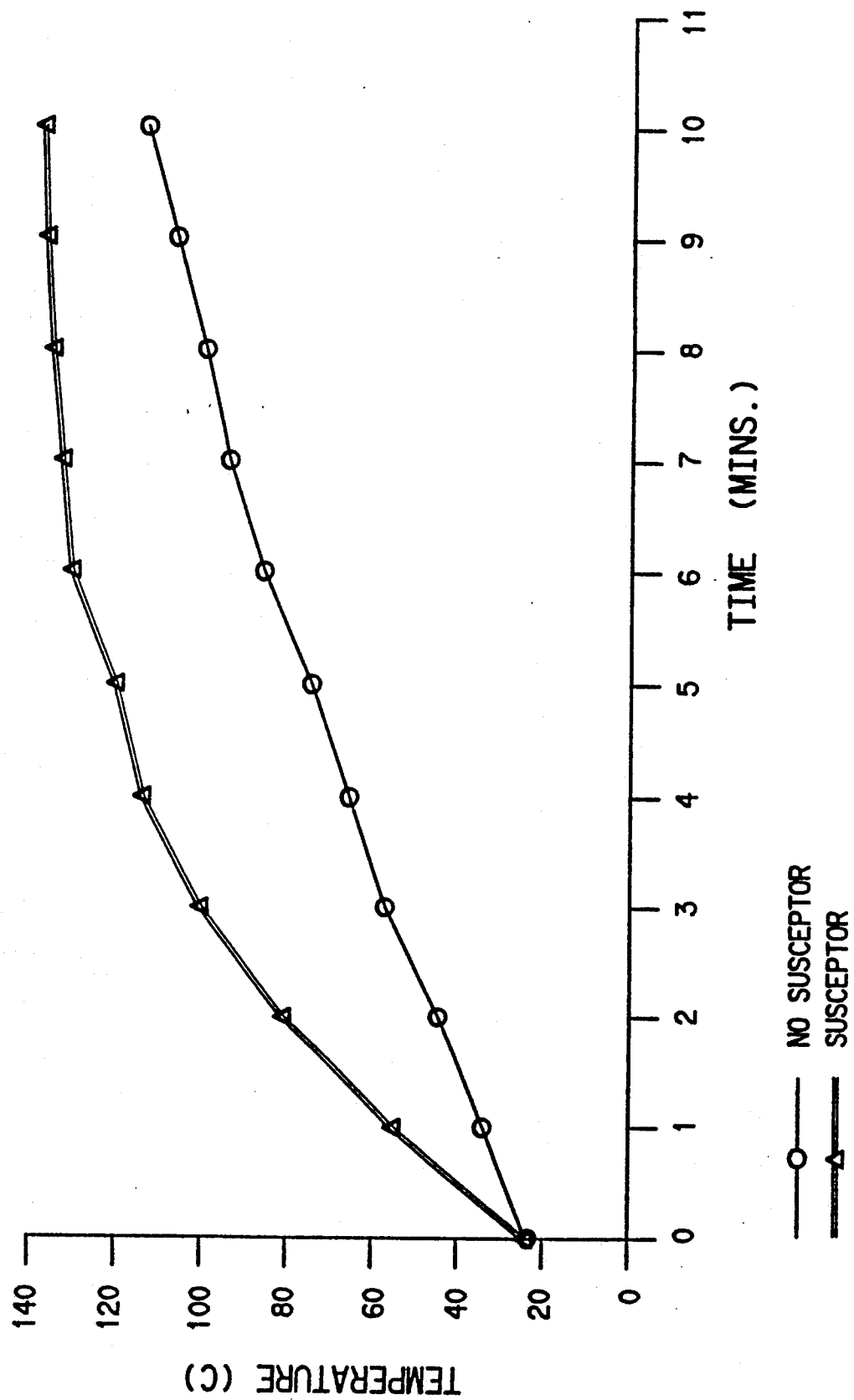

FIGS. 1, 2 and 3 compare the temperature rises for three different such systems, using a susceptor (triangles) and without any such susceptor (circles). In each case the susceptor was magnesium chloride, and was applied as 10% by weight of the fiber. FIG. 1 shows the contrast between the rather slow rise in temperature for an undrawn binder fiber of 2G-T, i.e. poly(ethylene terephthalate) that is undrawn amorphous fiber, blended with drawn and relaxed 2G-T (i.e. crystalline poly(ethylene terephthalate), when tested without susceptor (circles), and the rapid rise in temperature when tested with susceptor (triangles). FIG. 2 shows similar curves for a blend of the same type of conventional drawn (crystalline) 2G-T as the load-bearing fiber with and 2G-T/2G-I (70/30) as the binder fiber. FIG. 3 shows a test of 100% 50/50 bicomponent fiber, with a load-bearing core of 2G-T surrounded by a sheath of 2G-T/2G-I(70/30) as binder material.

Figure 4:
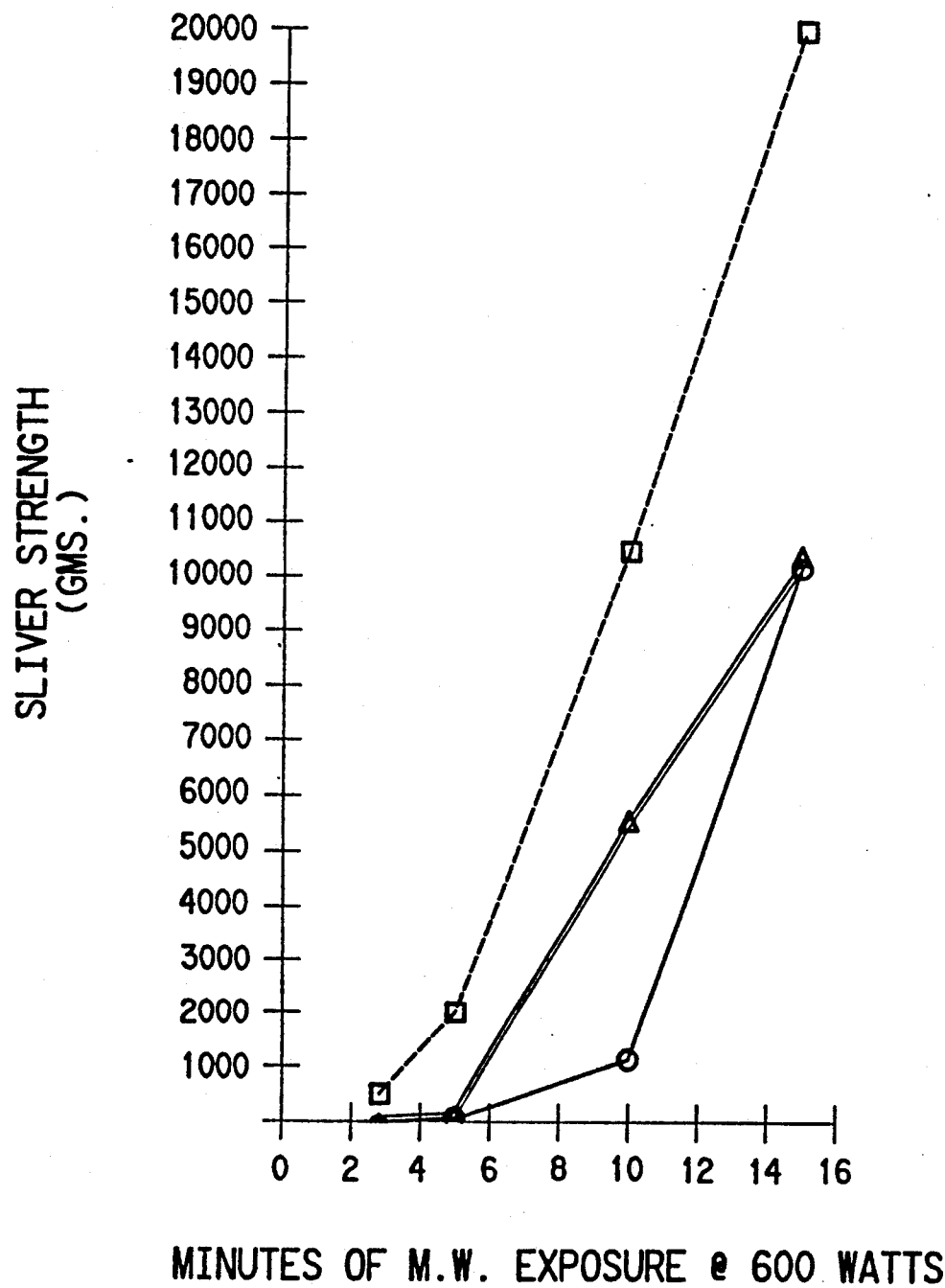
FIG. 4 shows curves plotting sliver strength against time according to the test procedure described herein.

The effectiveness of the bonding is also shown in FIG. 4, which compares the strengths of slivers treated as above for FIG. 3, but after exposure to EMR for different exposure periods. The sliver is cooled, and then tested in a tensile tester at a gauge length higher than the fiber cut length (3 inches). In FIG. 4, the circles (as before) show dry fiber without susceptor, but the squares show the fiber with susceptor (in this case, an aqueous solution of 10% by weight of LEOMIN-PN, applied in amount 10% by weight of fiber), whereas the triangles show the fiber treated with 10% by weight (on the fiber) of water only, i.e. without susceptor.

The following are examples of EMR susceptors that may be applied to the binder fibers topically, e.g. as part of a spin finish to the extruded fiber:

| | |
|---|---|
| Leomin PN | Potassium Dodecyl Phosphate 50/50 mono and di |
| Magnesium chloride | ($MgCl_2$) |
| Sodium Nitrite | ($NaNO_2$) |
| Tryfac 525 $K^3$ | Anionic alkyl potassium phosphate |
| Avitex 6311 | Coco trimethyl ammonium methosulphate |
| Deriphat 160 | Disodium n-lauryl-b-imino propionate |
| Zelec NK | Diethanolamine salt of mono and diacid phosphate esters |
| Synlube | Castor oil w/25EO |

The following are examples of EMR susceptors that may be incorporated into the fiber, or applied topically, as they are not color-formers, not toxic, and do not give off noxious gases, and have the advantage of having water incorporated:

| COMPOUND | FORMULA |
|---|---|
| Barium Hydroxide | $Ba(OH)_2.8H_2O$ |
| Bismuth Dl-lactate | $Bi(C_6H_9O_6).7H_2O$ |
| Calcium Carbonate | $CaCO_3.6H_2O$ |
| Calcium Chlorate | $Ca(ClO_3)2.2H_2O$ |
| Calcium Sulfate | $CaSO_4.2H_2O$ |
| Magnesium Sulfate | $MgSO_4.7H_2O$ |
| Magnesium Thiosulfate | $MgS_2O_3.6H_2O$ |
| Sodium Acetate | $NaC_2H_3O_2.3H_2O$ |
| Sodium Tetraborate | $Na_2B_4O_7.10H_2O$ |
| Sodium Glycerophosphate | $Na_2C_3H_7O_6P.5.5H_2O$ |
| Magnesium Nitrate | $Mg(NO_3)_2.6H_2O$ |
| Magnesium Benzoate | $Mg(C_7H_5O_2)_2.3H_2O$ |
| Potassium Chloride | $KCl$ |
| Potassium Iodide | $KI$ |
| Potassium Bromide | $KBr$ |
| Sodium Chloride | $NaCl$ |
| Sodium Bromide | $NaBr.2H_2O$ |
| Sodium Iodide | $NaI.2H_2O$ |
| Sodium Hypophosphate | $Na_4P_2O_6.10H_2O$ |

EXAMPLES

The following are examples of products that have been made. All amounts and percentages are by weight (based on fiber content) unless otherwise indicated. The 2G-T/2G-I binder fiber contained 30% of 2G-I and 70% of 2G-T.

A. Auto Roof Liners

1. I used a 20 oz./yd² batt weight made of a blend of structural (load-bearing) fibers of 5 dpf 2G-T ( 75% ), with binder fiber of 3 dpf 2G-T/2G-I ( 25% ), and I applied, as susceptor, Leomin PN to get a concentration of 0.2% chemical on fiber with over 5% moisture. This was heated in a microwave tunnel with 4 zones of 2.5 KW, and a residence time of 1 minute per zone. After leaving the tunnel, the batt (while still hot) was compressed to the required thickness ⅛ inch) and shaped in the hot condition and cooled to below the glass transition temperature (Tg) of the fibers. The density of the resulting bonded article was 0.1 (±0.02) g/cc.

2. The same liner made using with the other binders listed, i.e. undrawn 2G-T, and copolymers of poly(ethylene terephthalate) with glutarate and DEG contents to provide for slow crystallization.

3. The same liner made with 100% conjugate (sheath/core) fibers where the core is 2G-T and the sheath is a binder material as indicated above.

4. The above 3 experiments were repeated, using RF, and (between ceramic coated platens to avoid arcing) a field of 9 to 10 MHZ, and a power level of approximately 8 KW/lb. of fiber for 3 minutes, to yield structures similar in properties and shape.

5. All the above experiments were repeated using other susceptors, namely magnesium chloride and Tryfac.

B. Bonded Batts

These were of variable density and structures, made by heating the materials in examples A. 1-4 in a standard 650 watt microwave oven, and compressing to densities of 0.5 lbs./cu ft. to 1.5 lb./cu. ft.

1. I made the lighter weight (0.3 to 1.0 lb./cu. ft.) low dpf batts such as those made with 60 and 90% 5 dpf 2G-T fibers and 40% and 10% of binders, respectively, and 100% conjugate sheath/core fibers, to give batts to be used in apparel such as ski jackets, gloves, comforters.

2. The heavier (denser) batts, approximately 1.5 lb./cu. ft., were made inside non-susceptible ticking for use in cushions or mattresses, with higher denier (15 dpf) load-bearing fibers.

C. Three Dimensional Fibrous Structures

These may be made using fiber balls as described in Marcus U.S. Pat. No. 4,818,599, made active by using a susceptor, as indicated, and heated in RF field at a power rating of 10 KW per lb. or in a MW field at 8 KW/sq. ft. and held restrained until cooled below the Tg. These structures give 3 dimensional (isotropic) resilience, such as is preferred in some types of cushioning material.

D. Hard Composite Structures

The mode of microwave heating may also be used to make composite structures, using the ingredients mentioned previously. The reinforcing or load-bearing fibers and the fusible fibers may be laid wet on a papermaking machine, or dry on a card or in a sandwich structure of alternate layers of binder and load-bearing fibers.

I made such structure using a glass matt (in amount 70%) sandwiched between layers of 2G-T/2G-I (70/30) binder fiber (in amount 30%), coated in amount 10% (FOT) with an aqueous (1%) Leomin PN solution. The sandwich was held restrained in a MW oven between two glass dishes and heated for 30 minutes. The pressure was applied by loading the top dish with sand. The resulting structure had a yield strength of 5,000 lb/in2 and a modulus of 50,000 lb/in2 in bending.

As indicated, the use of fiberballs as described in Marcus, U.S. Pat. No. 4,818,599, containing a blend of polyester fiber (as load-bearing fiber) with a binder fiber, plus an EMR susceptor and moisture, is expected to be a particularly attractive way to make useful bonded structures. In this respect, reference may be made to Marcus U.S. Pat. No. 4,940,502, for a description of a method and apparatus for making bonded nonwoven structures that may conveniently be adopted for use according to the present invention, which is hereby specifically incorporated herein by reference.

As indicated hereinbefore, the bonded articles according to the invention may be of widely varying densities, starting from low density batt-like open structures before bonding, if desired, and compressing these structures in a mold-type device so as to obtain the density desired for the bonded article. The bonded article may be in a continuous strip form, like a batt, or shaped as desired. Thus, the invention has the advantage of providing flexibility. As for desired density, the following density ranges are approximate and typical for various types of product and show the variations that may be obtained according to the invention:

| Low Density | Comforters | 0.003 to 0.01 g/cc |
|---|---|---|
| Higher Density | Mattresses | 0.01 to 0.04 g/cc |
| | Cushions | 0.01 to 0.04 g/cc. |

Such products may advantageously be made in the form of bonded batt-type fibrous structures, which may be made continuously, or semi-continuously, as described hereinbefore, and then cut to shape, as desired. Alternatively, if desired, molded articles may be made as follows:

Automobile Roof Liners—0.08 to 0.15 g/cc
Composites—1 to 2 g/cc.

I claim:

1. A bonded article of load-bearing fibers that are bonded by a bonding agent, said load-bearing fibers having a relatively high temperature-resistance in contrast to a relatively low flow temperature for said bonding agent, wherein said bonding agent is an ethylene terephthalate polymer containing an electromagnetic radiation susceptor.

2. An article according to claim 1, said article being in the form of a bonded batt-type structure of uniform low density about 0.003 to about 0.01 g/cc.

3. An article according to claim 1, said article being in the form of a bonded batt-type structure of uniform high density about 0.01 to about 0.04 g/cc.

4. An article according to claim 1, said article being in the form of a molded composite of density about 1 to 2 g/cc.

5. An article according to claim 1, said article being in the form of a molded article of density about 0.08 to about 0.15 g/cc.

6. An article according to any one of claims 1 to 5, wherein the bonded fibers consist essentially entirely of or are comprised partially of polyester fibers.

7. An article according to claim 6, wherein the said polyester fibers are ethylene terephthalate polyester fibers.

8. A fiber of poly(ethylene terephthalate) that shows a crystallization peak and that contains an electromagnetic radiation susceptor in such amount as to raise the temperature of a blend consisting of said fiber in amount 50% by weight with 50% by weight of poly(ethylene terephthalate) fiber having a crystalline melting point and in the presence of an effective amount of moisture, to over 100° C. within a period of at most 6 minutes upon exposure in a 650 watt microwave oven in the glass tube test.

9. A fiber of an ethylene terephthalate copolymer with at least sufficient comonomer that the copolymer does not show a crystallization peak, and containing an electromagnetic radiation susceptor in such amount as to raise the temperature of a blend consisting of said fiber in amount 50% by weight with 50% by weight of poly(ethylene terephthalate) fiber having a crystalline melting point, and in the presence of an effective amount of moisture, to over 100° C. within a period of at most 6 minutes upon exposure in a 650 watt microwave oven in the glass tube test.

* * * * *